(12) United States Patent
Ohtsuki

(10) Patent No.: US 6,929,331 B2
(45) Date of Patent: Aug. 16, 2005

(54) WHEEL SUPPORT BEARING ASSEMBLY

(75) Inventor: Hisashi Ohtsuki, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/654,965

(22) Filed: Sep. 5, 2003

(65) Prior Publication Data

US 2004/0046441 A1 Mar. 11, 2004

(30) Foreign Application Priority Data

Sep. 11, 2002 (JP) ........................................ 2002-266051

(51) Int. Cl.$^7$ ............................................. B60B 27/00
(52) U.S. Cl. ............................... 301/105.1; 301/124.1; 384/589
(58) Field of Search ............................. 301/105.1, 111, 301/137, 124.1; 384/589, 584; 464/178; 180/254

(56) References Cited

U.S. PATENT DOCUMENTS

| 5,454,628 | A | | 10/1995 | Maiworm et al. | |
|---|---|---|---|---|---|
| 5,935,379 | A | * | 8/1999 | Frantz et al. | 156/555 |
| 6,017,097 | A | * | 1/2000 | Weir, III | 301/105.1 |
| 6,170,919 | B1 | * | 1/2001 | Hofmann et al. | 301/105.1 |
| 6,406,186 | B1 | | 6/2002 | Torii et al. | |
| 6,626,579 | B1 | * | 9/2003 | Silvasi | 384/476 |
| 6,644,858 | B2 | * | 11/2003 | Torii et al. | 384/448 |
| 2002/0118899 | A1 | | 8/2002 | Torii et al. | |

FOREIGN PATENT DOCUMENTS

| EP | 0 800 011 | | 10/1997 | |
|---|---|---|---|---|
| JP | 221243 | A * | 8/2000 | |
| JP | 2001221243 | A * | 8/2001 | F16C/41/00 |
| JP | 2002071065 | A * | 3/2002 | F16L/23/026 |
| JP | 071065 | A * | 8/2002 | |
| JP | 2003072310 | | 3/2003 | |
| WO | 03/064238 | | 8/2003 | |

OTHER PUBLICATIONS

European Search Report.

* cited by examiner

Primary Examiner—Frantz F. Jules

(57) ABSTRACT

To provide a wheel support bearing assembly coupled with the knuckle of a type made of an aluminum alloy, in which an undesirable occurrence of electrocorrosion resulting from a galvanic cell developed at a surface area where the wheel support bearing assembly contacts the aluminum alloy knuckle is substantially eliminated, a wheel support bearing assembly is provided with an outer member (1) having an inner peripheral surface formed with raceways (4), an inner member (2) having raceways (5) defined therein in alignment with the raceways (4) in the outer member (1), and rows of rolling elements (3) positioned between the raceways (4 and 5) in the outer and inner members (1 and 2), respectively. The outer peripheral surface of the outer member (1) is formed with a vehicle body fitting flange (1a) for securement of the wheel support bearing assembly to a knuckle (14) made of an aluminum alloy and the outer peripheral surface of the inner member (2) is formed with a wheel mounting flange (2a) for the support of a vehicle wheel. An electrically insulating layer (17) is provided at a surface area of contact between the outer member (1) and the knuckle (14), that is, on a portion of the outer peripheral surface of the outer member (1) that is received in a bearing bore (14a) of the knuckle (14) and one of axial end faces of the vehicle body fitting flange (1a).

7 Claims, 3 Drawing Sheets

WHEEL SUPPORT BEARING ASSEMBLY

BACKGROUND OF THE INVENTION

1. Field of the Invention

The present invention generally relates to a wheel support bearing assembly for supporting a wheel that is used in, for example, an automotive vehicle and, more particularly, to the wheel support bearing assembly that is coupled with a knuckle made of an aluminum alloy and designed to have a reduced weight.

2. Description of the Prior Art

A wheel support bearing assembly for rotatably supporting a wheel relative to an automobile suspension system has now come to be manufactured with its weight reduced aiming an increase of the mileage accomplished by an automotive vehicle. In an effort to further reduce the weight of the knuckle, the use of the knuckle made of an aluminum alloy, in place of the knuckle made of, for example, malleable cast iron, has in recent years increased as well as slimming the knuckle with extra wall thickness reduced as much as possible.

Since the aluminum alloy has a density that is about one third of that of steel, and even though the knuckle made of the aluminum alloy is manufactured to have a thick walled structure for the purpose of compensating for reduction in rigidity of the aluminum alloy as compared with that of steel, the knuckle made of aluminum alloy can have a weight that is at least half the weight of the conventional knuckle made of steel. Also, as a result of advance in the art of casting, formation of cavities resulting from difference in wall thickness, which has hitherto been considered a problem peculiar to the aluminum alloy, has now come to be suppressed to such an extent that the strength thereof will not be adversely affected. In view of these factors, the aluminum alloy knuckle is expected to be used widely in the near future.

FIG. 5 illustrates the conventional wheel support bearing assembly in a fragmentary longitudinal sectional representation, in which only one of longitudinal halves thereof is shown. The illustrated wheel support bearing assembly is an inner race rotating type of a, so called, third generation and is specifically used for the support of a driven wheel. The wheel support bearing assembly shown therein includes an outer member 31 of one-piece construction including a vehicle body fitting flange 31a formed integrally with an outer periphery thereof so as to extend radially outwardly therefrom, an inner member 32 made up of a hub wheel 32A and a separate inner race forming member 32B mounted firmly on one end of an outer peripheral surface of the hub wheel 32A, and dual rows of rolling elements rollingly accommodated within an annular working space delimited between the inner and outer members 32 and 31. While the outer member 31 has axially spaced apart raceways 34 defined in an inner peripheral surface thereof and the inner member 32 has similarly axially spaced apart raceways 35 defined in an outer peripheral surface thereof, the rows of the rolling elements 33 within the annular working space are received in part within the raceways 34 in the outer member 31 and in part within the raceways 35 in the inner member 32, respectively.

The hub wheel 32A forming a part of the inner member 32 has an outboard end formed integrally with a wheel mounting flange 32a protruding radially outwardly therefrom and a wheel (not shown) is fitted to the wheel mounting flange 32a by means of a plurality of bolts 48. On the other hand, the vehicle body fitting flange 31a integral with the outer member 31 is firmly coupled by means of a bolt 49 with a knuckle 44 that is made of an aluminum alloy and rigidly secured to the vehicle body structure, to thereby allow the wheel to be rotatably supported by the knuckle 44.

The annular working space delimited between the inner and outer members 32 and 31 has inboard and outboard open ends opposite to each other, which are sealed by respective sealing members 37 and 38 to thereby avoid leakage of a lubricant grease filled inside the bearing assembly and also to avoid ingress of rain drops, dusts and dirt into the annular working space.

While the use of the aluminum alloy knuckle 44 contributes to reduction in weight, a potential difference tends to develop between the aluminum alloy used as a material for the knuckle 44 and the steel used as a material for the outer member 31. Because of this, a galvanic cell tends to develop when a surface of the outer member 31 that is held in contact with the knuckle 44 is wetted by muddy brackish water, resulting in electrocorrosion taking place in that contact surface. Once this electrocorrosion occurs, the outer member 31 and the knuckle 44 may be interlocked with each other at that surface where electrocorrosion occurs, hampering the workability during inspection and repair. Although the electrocorrosion can be prevented if an electric insulating material is interposed between the outer member 31 and the knuckle 44, the use of the electric insulating material is an addition to the number of component parts and, therefore, not only does the parts control tend to be complicated, but complicated assembly procedures would be required to connect the wheel support bearing assembly to the knuckle.

As is well known to those skilled in the art, electrostatic charge is built up in the wheel tire during run of the automotive vehicle. This electrostatic charge is conducted to the vehicle body structure through the wheel support bearing assembly made of the inner member 32, the rolling elements 33 and the outer member 31, and then through the knuckle 44. In the event that films of the lubricant oil present between the raceways 35 in the inner member 32 and the rolling elements 33 or between the raceways 34 in the outer member 31 and the rolling elements 33 are insufficient, sparks tend to be induced by the electrostatic charge at the interfaces between the raceways 35 in the inner member 32 and the rolling elements 33 or between the raceways 34 in the outer member 31 and the rolling elements 33, which sparks lead to a cause of generation of noises from a vehicle mounted radio receiver set.

SUMMARY OF THE INVENTION

In view of the foregoing, the present invention has for its primary object to provide a wheel support bearing assembly of a type coupled with the knuckle made of an aluminum alloy, in which an undesirable occurrence of electrocorrosion at a surface area where the wheel support bearing assembly contacts the aluminum alloy knuckle is substantially eliminated without incurring an increase in number of component parts used.

Another important object of the present invention is to avoid generation of sparks between the raceways in the inner or outer members and the respective rows of the rolling elements without incurring an increase in number of component parts used, to thereby eliminate generation of noises from the vehicle mounted radio receiver set, which would otherwise occur as a result of the sparks.

In order to accomplish these objects of the present invention, there is provided a wheel support bearing assembly for rotatably supporting a wheel relative to a vehicle body structure, which assembly includes an outer member having an outer peripheral surface formed with a vehicle body fitting flange for securement of the wheel support bearing assembly to a knuckle made of an aluminum alloy and also having an inner peripheral surface formed with raceways, an inner member having a wheel mounting flange formed at one end thereof and also having raceways defined therein in alignment with the raceways in the outer member, and rows of rolling elements positioned between the raceways in the outer member and the raceways in the inner member, respectively. An electrically insulating layer is provided at a surface area of contact between the outer member and the knuckle.

Considering that the outer member is generally made of steel, a metal-to-metal contact susceptible to generation of a potential difference occurs between the outer member and the knuckle if the knuckle is made of an aluminum alloy. However, according to the present invention, the surface area of contact between the outer member, made of steel, and the knuckle made of the aluminum alloy is covered by the electrically insulating layer, no galvanic cell develop between the outer member and the knuckle even when such surface area of contact is wetted by muddy brackish water and, therefore, an undesirable occurrence of electrocorrosion can be avoided. The presence of the electrically insulating layer at the interface between the outer member and the knuckle brings about an additional advantage in that unlike the use of a separate and independent electrically insulating layer the number of component parts employed will not increase, resulting in alleviation of complication of the parts control and reduction in workability.

It is to be noted that the electrically insulating layer may be provided over the entire surface area of contact between the outer member and the knuckle, or a portion of such entire contact surface area.

The electrically insulating layer may be provided on a portion of an outer peripheral surface of the outer member, that is received in the knuckle, and one of axial end faces of the vehicle body mounting flange confronting the knuckle. Since the knuckle, when the wheel support bearing assembly is coupled therewith, is held in abutment with the axial end face of the vehicle body mounting flange with an inboard end of the outer member received within the knuckle, the presence of the electrically insulating layer on that portion of the outer peripheral surface of the outer member and the axial end face of the vehicle body mounting flange prevents an undesirable electrocorrosion which would otherwise occur at an entire contact surface area between the outer member and the knuckle.

The electrically insulating layer may include a combination of a plated ply with a coating ply formed on the plated ply, or solely a coating ply. The coating ply may be a resin coating or a painted coating. Where the coating is employed, the electrically insulating layer can easily be formed.

In the practice of the present invention, the inner member is positioned inside the outer member with an annular working space defined therebetween and having inboard and outboard open ends opposite to each other. In such case, inboard and outboard sealing members are employed for sealing the inboard and outboard open ends of the annular working space, respectively. Preferably, at least one of the inboard and outboard sealing members is a contact type seal having an electroconductive elastic element that is held in sliding contact.

Where one or both of the sealing members has an electroconductive property, an electric current between the inner and outer members flows through such one or both of outboard and inboard sealing members. In other words, an electrostatic charge developed by and in the tire of the vehicle wheel is conducted from the inner member to the outer member through the outboard or inboard sealing members and then from the outer member to the knuckle by way of the bolts used to secure the wheel support bearing assembly to the knuckle, finally being discharged to the vehicle body structure. Because of this, no spark will be induced by the electrostatic charge at the interfaces between the raceways in the inner or outer member and the rolling elements even though the films of the lubricant oil present at those interfaces are insufficient. Hence, there is no possibility that the vehicle mounted radio receiver set will be adversely affected by noises which would otherwise result from the sparks. In addition, since the electrostatic charge is conducted through the outboard or inboard sealing members, no separate element for conducting the electrostatic charge from the inner member towards the outer member is needed, resulting in reduction in number of component parts employed in the wheel support bearing assembly of the present invention.

It is pointed out that in the case of the wheel support bearing assembly designed to rotatably support a vehicle drive wheel, since the electrostatic charge can be discharged to the vehicle body structure through a constant velocity universal joint coupled with the inner member, no potential difference develop virtually between the inner and outer members. In contrast thereto, in the case of the wheel support bearing assembly designed to rotatably support a vehicle driven wheel, no discharge path leading to the vehicle body structure through the constant velocity universal joint is available and, therefore, the use of the electroconductive sealing members to suppress noises is particularly effective and efficient to the wheel support bearing assembly for the vehicle driven wheel.

Preferably, the contact type sealing member having the electroconductive elastic element that is held in sliding contact includes an electroconductive core metal fitted to one of the inner and outer members and an elastic element secured to the core metal. The use of the sealing member including the core metal is effective in that the sealing member can be firmly fitted to achieve a stabilized contact.

Also the electroconductive elastic element may be employed in the inboard sealing member. In this case an electroconductive slinger is mounted on the inner member, and the inboard sealing is fitted to the outer member with a lip region being held in sliding contact with the electroconductive slinger. Even in this case, contact of the electroconductive sealing member can be highly stabilized.

BRIEF DESCRIPTION OF THE DRAWINGS

In any event, the present invention will become more clearly understood from the following description of preferred embodiment thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENT

Figure 1:
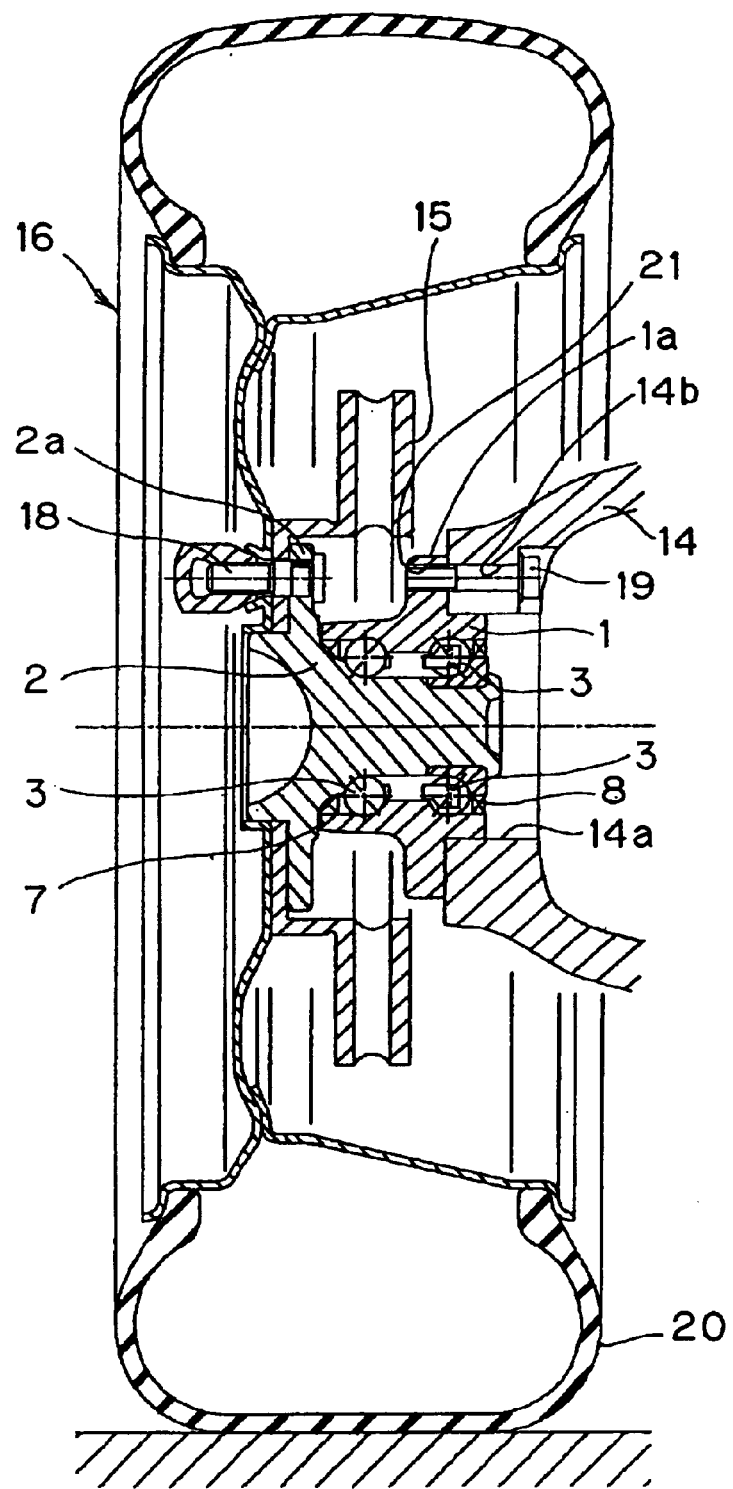
FIG. 1 is a longitudinal sectional view of a wheel support bearing assembly according to a preferred embodiment of the present invention, showing an automobile driven wheel being supported thereby.

A preferred embodiment of the present invention will now be described with reference to FIGS. 1 to 4. The wheel support bearing assembly shown therein is of an inner race rotating type and specifically used for the support of a driven wheel. This wheel support bearing assembly includes an outer member 1 having an inner peripheral surface formed with at least two axially spaced apart raceways 4, an inner member 2 positioned inside the outer member 1 to define an annular working space between it and the outer member 1 and having raceways 5 defined on an outer peripheral surface thereof in cooperative relation with and in alignment with the raceways 4 in the outer member 1, and rows of rolling elements 3 positioned within the annular working space and accommodated in part within the raceways 4 in the outer member 1 and in part within the raceways 5 in the inner member 2 to allow the inner member 2 to rotate relative to the outer member 1. The rolling elements 3 of each row are employed in the form of a ball and are rotatably retained by a retainer or cage 6 so as to assume a circumferentially extending row. The illustrated wheel support bearing assembly of the structure described is generally known as a dual row angular ball bearing assembly in which the raceways 4 and 5 that are generally arcuately concaved in section, have their respective contact angles so defined as to achieve a back-to-back arrangement. Respective opposite annular open ends (hereinafter referred to as "outboard and inboard open ends", respectively) of the annular working space delimited between the inner and outer members 2 and 1 are sealed by corresponding contact type sealing members 7 and 8.

The outer member 1 serving as a stationary member has a vehicle body fitting flange 1a formed in a portion of the outer member 1 generally intermediate of the length thereof so as to extend radially outwardly for securement of the wheel support bearing assembly therethrough to a knuckle 14. This vehicle body fitting flange 1a has a plurality of internally helically threaded bolt holes 21 defined therein in a row extending in a direction circumferentially of the outer member 1 for threadingly receiving corresponding bolts 19 used to secure the wheel support bearing assembly to the knuckle 14.

On the other hand, the inner member 2 serves as a rotatable member and, so far shown, is of two-piece construction made up of a hub wheel 2A having a wheel mounting flange 2a defined therein so as to extend radially outwardly from an outer periphery thereof, and an inner race forming member 2B mounted on an inboard end of the hub wheel 2A. So far shown, the inner race forming member 2B is a member separate from the hub wheel 2A, but is mounted on the inboard end of the inner member 2 for rotation together with the hub wheel 2A. The raceways 5 in the inner member 2 discussed above are defined in the hub wheel 2A and the inner race forming member 2B, respectively. The wheel mounting flange 2a referred to above is positioned on an outboard end of the inner member 2 and, as best shown in FIG. 1, a vehicle driven wheel 16 is firmly secured to this wheel mounting flange 2a through a brake rotor 15 by means of a plurality of bolts 18 in a manner well known to those skilled in the art. The inner race forming member 2B is axially fastened and fixed in position on the hub wheel 2A by means of a crimping portion provided on an inboard end of the hub wheel 2A. The knuckle 14 referred to above is a generally cylindrical member fitted to the vehicle body structure (not shown) and has a bearing bore 14a defined therein for receiving therein an inboard end of the wheel support bearing assembly. This knuckle 14 also has bolt insertion holes 14b defined therein. Specifically, the wheel support bearing assembly embodying the present invention can be firmly connected with the knuckle 14 by inserting the inboard end of the outer member 1 into the bearing bore 14a in the knuckle 14 until the vehicle body fitting flange 1a is brought into abutment with a mating end face of the knuckle 14 around the bearing bore 14a and then by inserting the bolts 19 tightly into the internally threaded bolt holes 21 in the vehicle body fitting flange 1a through the corresponding bolt insertion holes 14b as shown in FIG. 1.

The knuckle 14 employed in the practice of the present invention is made of an aluminum alloy. On the other hand, the inner and outer members 2 and 1 and the rolling elements 3 all forming respective parts of the wheel support bearing assembly are made of steel such as, for example, carbon steel or high carbon chrome steel.

Figure 2:
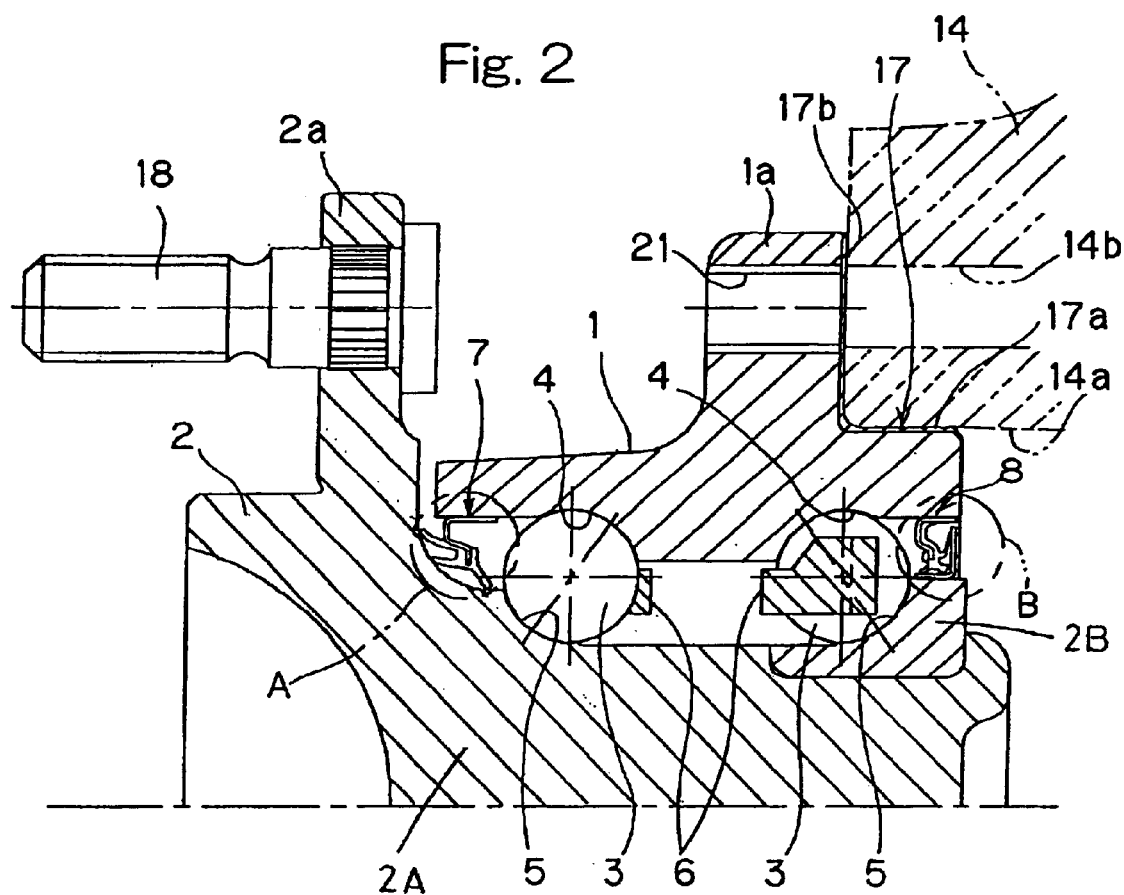
FIG. 2 is a fragmentary longitudinal sectional view of the wheel support bearing assembly.

Referring particularly to FIG. 2, an electrically insulating layer 17 is disposed at a substantially entire surface area of contact between the outer member 1 and the knuckle 14. This electrically insulating layer 17 includes an axial layer segment 17a deposited on an outer peripheral surface area of the inboard end of the outer member 1, on which area the knuckle 14 is mounted, and a radial layer segment 17b extending radially outwardly and continuously from the axial layer segment 17a and deposited on one of opposite axial end faces of the vehicle body fitting flange 1a that is held in contact with the knuckle 14.

The electrically insulating layer 17 may be of a double ply structure including a plated ply and a coating ply deposited over the plated ply or of a single ply structure including solely a coating ply. The coating ply may be prepared from a synthetic resin or a paint material formed by applying a paint. Where the electrically insulating layer 17 is of the double ply structure including the plated ply with the coating ply deposited thereover, it may be of, for example, a structure in which the plated ply such as, for example, a chromate treated layer is covered by a low temperature thermosetting coating. For the low temperature thermosetting coating referred to above, a single part low temperature curable coating material may be employed. Also, the electrically insulating layer 17 may be formed by the use of an electrostatic powder coating technique. In this electrostatic powder coating, a coating material such as, for example, a powdery baked epoxy paint, an acrylic paint, a solvent baked acrylic paint or an amino alkyd paint may be employed.

Figure 3:
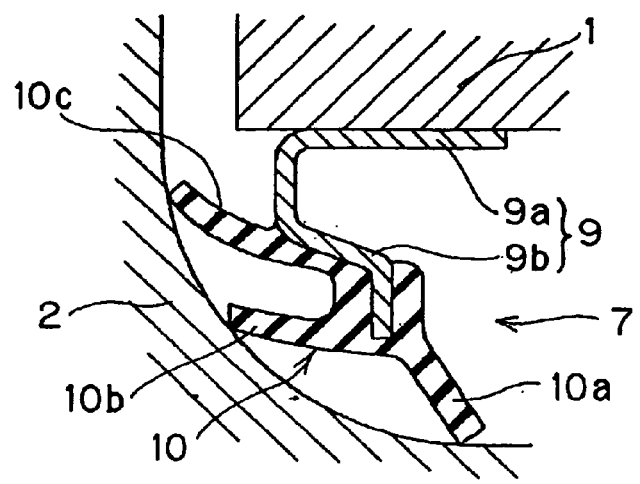
FIG. 3 is a fragmentary longitudinal sectional view, on an enlarged scale, of a portion of the wheel support bearing assembly, showing the details of a sealing structure employed at a location marked "A" in FIG. 2.

Referring now to FIG. 3 showing, on an enlarged scale, a portion of FIG. 2 encircled by A in FIG. 2, the outboard sealing member 7 used to seal the outboard open end of the annular working space includes an electroconductive core metal 9, made of, for example, steel, and an electroconductive elastic element 10 made of, for example, an electroconductive rubber material and secured to the core metal 9. The core metal 9 is of a generally L-sectioned configuration including an axially extending cylindrical wall 9a and a generally radially extending wall 9b. The outboard sealing member 7 is fitted to the outer member within the annular working space with the cylindrical wall 9a press-fitted to the inner peripheral surface of the outer member 1.

The electroconductive rubber material used as a material for the elastic element 10 is of a kind having a volume resistivity not higher than $30 \times 10^3$ Ω·cm. The elastic member 10 so made of the electroconductive rubber material includes a plurality of, for example, three elastic lips 10a, 10b and 10c having their respective free ends held in sliding contact with the outer peripheral surface of the inner member 2 at a location adjacent the wheel mounting flange 2a. In particular, the elastic lip 10a extends generally radially within the annular working space whereas the other elastic lips 10b and 10c extend generally axially within the annular working space towards the root of the wheel mounting flange 2a. This outboard sealing member 7 effectively serves to avoid leakage of a lubricant grease, filled inside the wheel support bearing assembly, outwardly from the outboard open end of the annular working space and also to avoid ingress of rain drops, dusts and/or dirt from the outboard open end into the annular working space.

Figure 4:
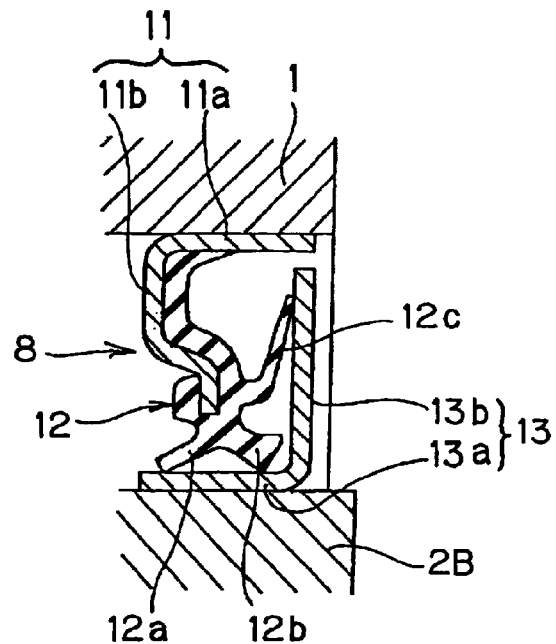
FIG. 4 is a fragmentary longitudinal sectional view, on an enlarged scale, of a portion of the wheel support bearing assembly, showing the details of a sealing structure employed at a location marked "B" in FIG. 2.
Figure 5:
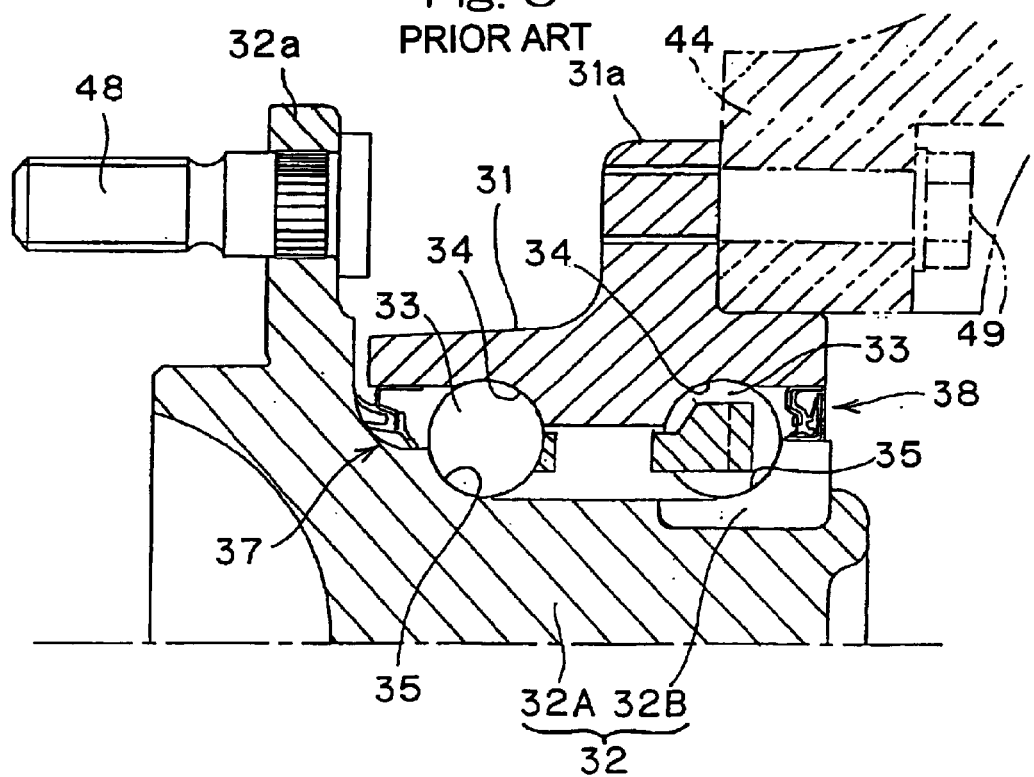
FIG. 5 is a fragmentary longitudinal sectional view of the conventional wheel support bearing assembly.

The details of the inboard sealing member 8 is shown in FIG. 4 which illustrates, on an enlarged scale, a portion of FIG. 2 encircled by B in FIG. 2. As shown therein, the inboard sealing member 8 used to seal the inboard open end of the annular working space similarly includes an electroconductive core metal 11, made of, for example, steel, and an electroconductive elastic element 12 made of, for example, an electroconductive rubber material and secured to the core metal 11. The core metal 11 is of a generally L-sectioned configuration including an axially extending cylindrical wall 11a and a generally radially extending wall 11b. The inboard sealing member 8 is fitted to the outer member 1 within the annular working space with the cylindrical wall 11a of the core metal 11 press-fitted to the inner peripheral surface of the outer member 1.

The electroconductive rubber material used as a material for the elastic element 12 is of a kind having a volume resistivity not higher than $30 \times 10^3$ Ω·cm. The elastic member 12 so made of the electroconductive rubber material includes a plurality of, for example, three elastic lips 12a, 12b and 12c having their respective free ends held in sliding contact with an electroconductive slinger 13 rigidly mounted on the outer peripheral surface of the inboard end of the inner member 2, particularly that of the inner race forming member 2B. The slinger 13 is made of, for example, steel such as stainless steel and is of a substantially L-sectioned configuration including a cylindrical wall 13a, press-fitted onto the inner member 2, and a radial wall 13b protruding from the cylindrical wall 13a towards the outer member 1.

Of the plural elastic lips 12a to 12c of the elastic element 12 forming a part of the inboard sealing member 8, the elastic lips 12a and 12b have their free ends held in sliding contact with the cylindrical wall 13a of the slinger 13 whereas the elastic lip 12c has its free end held in sliding contact with the radial wall 13b. This inboard sealing member 8 effectively serves to avoid leakage of a lubricant grease, filled inside the wheel support bearing assembly, outwardly from the inboard open end of the annular working space and also to avoid ingress of rain drops, dusts and/or dirt from the inboard open end into the annular working space.

With the wheel support bearing assembly of the present invention constructed as hereinbefore described, since the outer member 1 and the knuckle 14 are made of steel and an aluminum alloy, respectively, a metal-to-metal contact susceptible to generation of a potential difference occurs between the outer member 1 and the knuckle 14. However, since the substantially entire surface area of contact between the outer member 1 and the knuckle 14 covered by the electrically insulating layer 17, a galvanic cell does not develop between the outer member 1 and the knuckle 14 even when a surface area of the outer member 1 that is held in contact with the knuckle 14 and/or a surface area of the knuckle 14 that is held in contact with the outer member 1 is wetted by muddy brackish water. Accordingly, the presence of the electrically insulating layer 17 is effective to avoid an undesirable occurrence of electrocorrosion. The presence of the electrically insulating layer 17 at the interface between the outer member 1 and the knuckle 14 brings about an additional advantage in that unlike the use of a separate and independent electrically insulating layer the number of component parts employed will not increase, resulting in alleviation of complication of the parts control and reduction in workability.

Also, since the outboard and inboard sealing members 7 and 8 are made of an electroconductive material, an electric current between the inner and outer members 2 and 1 flows through those outboard and inboard sealing members 7 and 8. More specifically, an electrostatic charge developed by and in the tire of the vehicle wheel 16 is conducted from the inner member 2 to the outer member 1 through the outboard and inboard sealing members 7 and 8 and then from the outer member 1 to the knuckle 14 by way of the bolts 19, finally being discharged to the vehicle body structure. Because of this, no spark will be induced by the electrostatic charge at the interfaces between the raceways 5 in the inner member 2 and the rolling elements 3 or between the raceways 4 in the outer member 1 and the rolling elements 3 even though the films of the lubricant oil present at those interfaces are insufficient. Hence, there is no possibility that the vehicle mounted radio receiver set will be adversely affected by noises which would otherwise result from the sparks. In addition, since the electrostatic charge is conducted through the outboard and inboard sealing members 7 and 8, no separate element for conducting the electrostatic charge from the inner member 2 towards the outer member 1 is needed, resulting in reduction in number of component parts employed in the wheel support bearing assembly of the present invention.

It is to be noted that in the foregoing embodiment, both of the inboard and outboard sealing members 8 and 7 have been described as having an electroconductive property. However, the noise-avoiding advantages and effects described above in connection with the vehicle mounted radio receiver set can equally be obtained even where only one of the inboard and outboard sealing members 8 and 7 has an electroconductive property.

Also, although in the foregoing embodiment the electrically insulating layer 17 has been shown and described as provided on the outer member 1 at the substantially entire surface area of-contact with the knuckle 14, it may be provided partly at a portion of the entire surface area of contact with the knuckle 14. By way of example, the electrically insulating layer 17 may be provided on either only the outer peripheral surface of the outer member 1 or only the axial end face of the vehicle body fitting flange 1a that is held in contact with the knuckle 14.

Where the electrically insulating layer 17 is partly provided as hereinabove described, an electrically insulating sheet or plate (not shown) that is separate and independent from the electrically insulating layer 17 may be employed on the outer member 1 at a portion of the entire surface area of contact with the knuckle 14 that is free from the electrically insulating layer 17. By way of example, the separate and independent insulating sheet or plate referred to above may be interposed between that axial end face of the vehicle body fining flange 1a and the end face of the knuckle 14, while the electrically insulating layer 17 is provided, or otherwise deposited, on that portion of the outer peripheral surface of the outer member 1 that is received within the bearing bore 14a. Also, the electrically insulating layer 17 can be provided on the knuckle 14.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in the foregoing description the present invention has been shown and described as applied to the wheel support bearing assembly of a third generation, the present invention can be equally applied to any type of the wheel support bearing assembly, provided that it includes an outer member having an outer peripheral surface formed with a vehicle body fining flange and also having an inner peripheral surface formed with raceways, an inner member having a wheel mounting flange formed at one end thereof and also having raceways defined therein in alignment with the raceways in the outer member, and rows of rolling elements positioned between the raceways in the outer member and the raceways in the inner member. The rolling elements may not be always limited to a ball such as shown and described, but may be a tapered roller.

Accordingly, such changes and modifications are, unless they depart from the scope of the present invention as delivered from the claims annexed hereto, to be construed as included therein.

What is claimed is:

1. A wheel support bearing assembly rotatably supporting a wheel relative to a vehicle body structure, the wheel support bearing assembly comprising:
   an outer member having an outer peripheral surface formed with a vehicle body fitting flange to secure the wheel support bearing assembly to a knuckle made of an aluminum alloy, the outer member also having an inner peripheral surface with raceways defined therein, the outer member being made of steel;
   an inner member having a wheel mounting flange positioned at one end thereof and also having raceways defined therein in alignment with the raceways of the outer member;
   rows of rolling elements positioned between the raceways of the outer member and the raceways of the inner member, respectively; and
   an electrically insulating layer provided at a surface area of contact between the outer member and the knuckle, the electrically insulating layer consisting of a coating layer functioning as an electric insulator,
   wherein the coating layer is formed by a powder coating.

2. The wheel support bearing assembly as claimed in claim 1, wherein the electrically insulating layer is provided on a portion of an outer peripheral surface of the outer member, that is received in the knuckle, and one of axial end faces of the vehicle body mounting flange confronting the knuckle.

3. The wheel support bearing assembly as claimed in claim 1, wherein the inner member is positioned inside the outer member with an annular working space defined therebetween, the annular working space having inboard and outboard open ends opposite to each other, and further comprising inboard and outboard sealing members for sealing the inboard and outboard open ends of the annular working space, respectively, at least one of the inboard and outboard sealing members being a contact type seal having an electroconductive elastic element that is held in sliding contact.

4. The wheel support bearing assembly as claimed in claim 3, wherein the at least one of the inboard and outboard sealing members comprises an electroconductive core metal fitted to one of the inner and outer members and the elastic element secured to the core metal.

5. The wheel support bearing assembly as claimed in claim 3, further comprising an electroconductive slinger mounted on the inner member and wherein the at least one of the inboard and outboard sealing members is the inboard sealing member, the inboard sealing being fitted to the outer member and having a lip region that is held in sliding contact with the electroconductive slinger.

6. The wheel support bearing assembly as claimed in claim 1, wherein the powder coating is made of one of an epoxy paint or an acrylic paint.

7. A wheel support bearing assembly rotatably supporting a wheel relative to a vehicle body structure, the wheel support bearing assembly comprising:
   an outer member having an outer peripheral surface formed with a vehicle body fitting flange to secure the wheel support bearing assembly to a knuckle made of an aluminum alloy, the outer member also having an inner peripheral surface with raceways defined therein, the outer member being made of steel;
   an inner member having a wheel mounting flange positioned at one end thereof and also having raceways defined therein in alignment with the raceways of the outer member;
   rows of rolling elements positioned between the raceways of the outer member and the raceways of the inner member, respectively; and
   an electrically insulating layer provided at a surface area of contact between the outer member and the knuckle, the electrically insulating layer comprising a plated ply with a chromate treated layer thereon, and a coating layer functioning as an electric insulator,
   wherein the coating layer is made from a low temperature thermosetting coating.

* * * * *